Patented Nov. 19, 1929

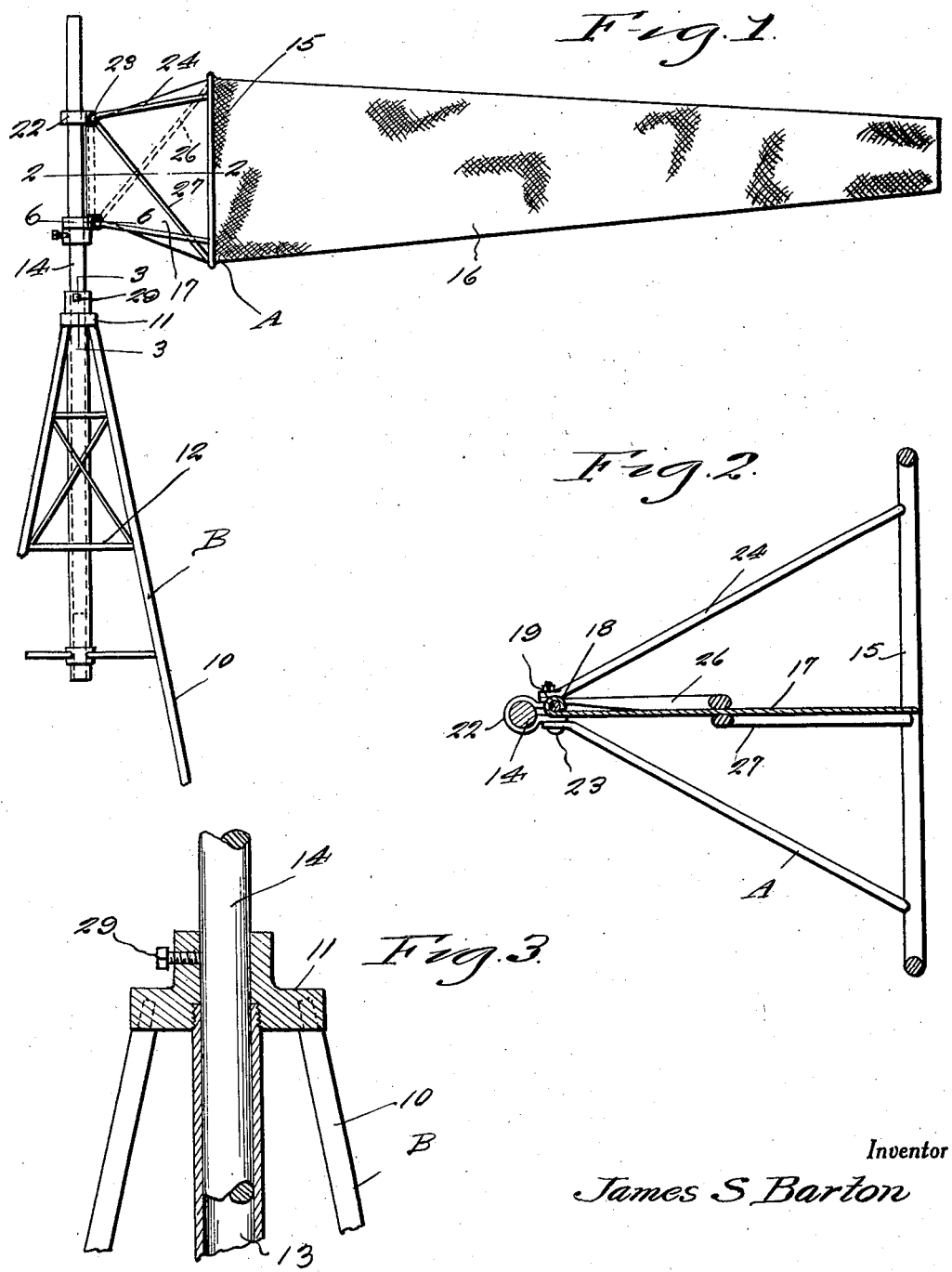
Nov. 19, 1929. J. S. BARTON 1,736,109
WIND CONE
Filed April 10, 1929  2 Sheets-Sheet 1
Inventor
James S. Barton

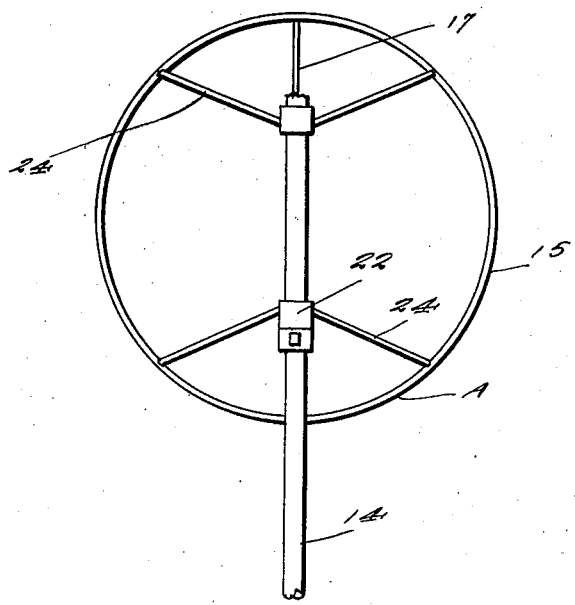
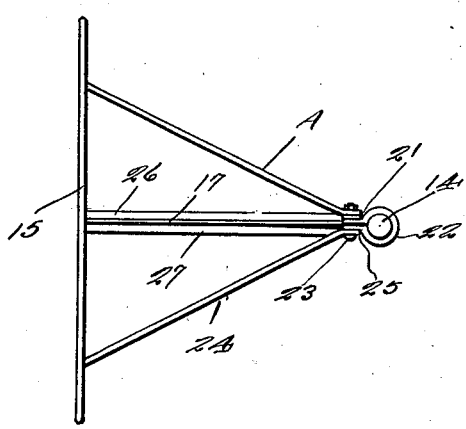
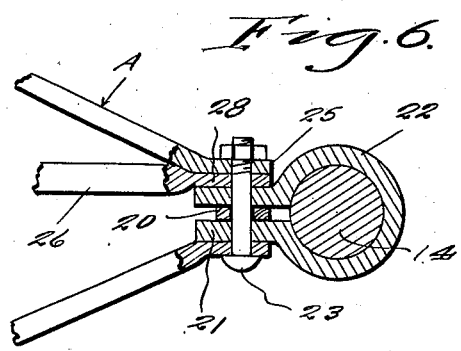

1,736,109

UNITED STATES PATENT OFFICE

JAMES S. BARTON, OF HOLLYWOOD, CALIFORNIA

WIND CONE

Application filed April 10, 1929. Serial No. 354,080.

This invention relates to appliances for use in conjunction with flying fields, airports and the like, and more particularly to a wind cone for indicating the direction of the wind to the aviator.

On flying fields, airports and the like, it is the common practice to use the so-called wind cone to give the direction of wind to the aviator. This wind cone is mounted upon a relatively high tower and consists of an elongated open sleeve for the wind stock made of flexible material and which is expanded and held horizontally by the wind flowing through the same.

This wind cone not only gives the direction of the wind, but also to a limited extent the force of the wind.

The use of such an apparatus is desirable as the elongated cone like sleeve can be readily seen by aviators both in the air and on the ground and facilitates the landing and taking off from the field. However, certain disadvantages of the wind cone has appeared, one of the same being that the cone will not always be held with the wind as the wind shifts and another a positive means for holding or attaching the cone to permit the free rotation thereof with the wind.

It is therefore one of the primary objects of my invention to provide a wind cone having a fin or rudder at the mouth of the wind stock, whereby the wind striking the fin or rudder will swing the wind stock to the wind so that the same will be filled and held in its elongated horizontal position.

Another salient feature of my invention is the provision of novel means for mounting the fin at the mouth of the cone and novel means for connecting the cone and fin on the tower for free rotation.

A further object of my invention is to provide a wind cone of the above character which will be durable and efficient in use, one that will be simple and easy to manufacture, and one that can be placed upon the market at a reasonable cost.

With these and other objects in view, the invention consists in the novel construction, arrangement and formation of parts as will be hereinafter more specifically described, claimed and illustrated in the accompanying drawings, in which drawings:

Figure 1 is a side elevation of my novel wind cone, showing the same supported at the upper end of a tower.

Figure 2 is a horizontal section, taken on the line 2—2 of Figure 1.

Figure 3 is a fragmentary vertical section, taken on the line 3—3 of Figure 1, illustrating the means of rotatably mounting the supporting shaft or mold on the tower.

Figure 4 is a rear elevation of the wind cone, showing the same removed from the tower and the lower end of the supporting mold broken away.

Figure 5 is a top plan view of the device, with the wind stop or sleeve removed from the supporting ring, and Figure 6 is an enlarged fragmentary horizontal section taken on the line 6—6 of Figure 1, illustrating the means employed for connecting the various parts to the supporting pole or sash.

Referring to the drawings in detail, wherein similar reference characters designate corresponding parts throughout the several views, the letter A generally indicates my improved wind cone, and B a tower for supporting the same. The tower B may be of any preferred or conventional construction and as shown includes the corner standards 10, gradually converging toward their upper ends and secured to a head block 11. The corner standards 10 can be braced in any desired way, such as by suitable struts and cross braces 12. The head block 11 can have secured thereto a depending sleeve 13, which supports the pole or staff 14, which forms a part of the wind cone A.

The wind cone A includes an annular supporting ring 15 of the desired diameter to which is laced or otherwise secured the wind stock 16 which can be of conventional construction. This wind stock, as usual, includes the elongated sleeve-like body formed of a suitable fabric, tapering toward its outer end and it is obvious that as the wind blows through the sleeve, the same will be elongated and held in a horizontal position.

In accordance with this invention, I provide a fin or rudder 17, disposed in a vertical plane and this fin or rudder can be made of sheet metal of the desired gauge and has its forward end extended into the ring 15 and secured thereto in any desired way. The fin is of plane contour. Thus it can be seen that the forward end of the fin 17 extends diametrically across the ring 15. The rear end of the fin can be slightly rolled as at 18 for reception of a reinforcing wire 19, which is secured thereto. This rod 19 extends beyond the upper and lower edges of the fins 17 at the rear end thereof and is provided with eyes 20 which are disposed between ears 21 formed on split collars 22. These collars 22 are loosely clamped about the pole or sash 14 by the use of bolts 23, which extend through the ears 21 and the eyes 20 of the rod 19.

In order to brace the ring 15, I provide rearwardly extending pairs of upper and lower brace rods 24 that gradually converge toward each other at the rear end of the fins. The rear ends of the rods 24 terminate in eyes and the upper pair of brace rods 24 are placed on opposite sides of the ears 21 of the upper collars 22 while the eyes of the lower pair of rods 24 are placed on the opposite sides of the ears 21 of the lower collar 22 and the retaining bolts 23 extend through the eyes of the rods 24.

In order to further brace the structure, particularly the fin 17, I provide diagonal brace bars 26 and 27 and these diagonal brace bars are located on the opposite sides of the fins as clearly shown in Figures 1 and 2 of the drawings. It is to be noted that the forward ends of these brace rods 26 and 27 are secured to the ring 15 at diametrically opposed points, while their inner ends extend toward their upper and lower collars 22 and the rear ends of these rods 26 and 27 are provided with eyes 28, through which the retaining bolts 23 also extend.

Thus, in effect, it can be seen that all of the brace members are held on the collars 22 by the use of a pair of bolts.

The shaft or pole 14 is keyed to the head block 11 of the tower by means of the set screw 29 whereby the rod is rigidly held within the sleeve 13, as is clearly shown in Figure 3.

From the foregoing, it can be seen that I have provided an exceptionally simple, yet strong wind cone, in which means is provided for positively holding the fabric sleeve or wind stock in the wind, thereby effectively insuring the proper use of the device at all times.

Changes in details may be made without departing from the spirit or scope of the invention.

What I claim as new is:

1. A wind cone for use in aviation fields comprising elongated sleeve of flexible material, a support for the inner end of the sleeve, means for rotatably supporting the sleeve, and a wind fin of plane contour carried by said support.

2. A wind cone comprising a supporting ring, an elongated sleeve of flexible material secured at its inner end to said ring, a vertically disposed supporting pole, means for rotatably securing the ring to the pole, and a fin of plane contour extending rearwardly from said ring at the vertical diametric center thereof to said pole.

3. A wind cone comprising a supporting ring, an elongated open sleeve of flexible material secured at its inner end to said ring, a pair of spaced collars arranged in vertical alignment in rear of said ring, a fin of plane contour secured at its forward end to said ring at the vertical diametric center thereof, and means securing the rear edge of the fin to said collars.

4. A wind cone for aviation fields comprising a supporting ring, a sleeve of flexible material secured at its inner end to said ring, a pair of spaced collars loosely arranged in vertical alignment in rear of said ring, apertured ears formed on said collars, upper and lower pairs of brace rods carried by the ring and extending toward the ears, a wind fin arranged between the brace rods and secured at its forward end to said ring at the vertical diametric center theerof, and means securing the rear edge of the fin and the rear ends of said rods to the ears.

5. A wind cone for aviation fields comprising a ring, an elongated open sleeve of flexible material secured at its rear end to said ring, a pair of spaced vertically aligned collars arranged in rear of said ring, said collars being split and provided with ears on opposite sides of said slits, rearwardly extending brace rods carried by the ring and extending toward said ears, a wind fin secured at its forward end to said ring at the vertical diametric center thereof, diagonally extending brace rods arranged on the opposite sides of the fin and secured at their forward ends to the ring and extending toward said ears, a supporting rod secured to the rear edge of the fin and extending beyond the upper and lower edges thereof, and fastening bolts extending through the ears, the rear ends of all of said brace rods, and the terminals of the brace rod for the fin.

6. In a wind cone for aviation fields, a supporting tower including a head block, a depending sleeve carried by the head block, a pole rigidly received in said sleeve, a ring, an elongated sleeve of flexible material secured at its rear end to said ring, a fin secured to the ring at the diametric vertical center of said ring, and means for loosely mounting the rear end of said fin upon said pole.

In testimony whereof I affix my signature.

JAMES S. BARTON.